United States Patent
Pascal et al.

(10) Patent No.: US 12,030,619 B2
(45) Date of Patent: Jul. 9, 2024

(54) UPLOCK PROVIDED WITH RETENTION DETECTION MEANS

(71) Applicant: SAFRAN LANDING SYSTEMS, Velizy Villacoublay (FR)

(72) Inventors: Vincent Pascal, Moissy-Cramayel (FR); Ludovic Dufay, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 17/769,462

(22) PCT Filed: Oct. 15, 2020

(86) PCT No.: PCT/EP2020/079134
§ 371 (c)(1),
(2) Date: Apr. 15, 2022

(87) PCT Pub. No.: WO2021/074348
PCT Pub. Date: Apr. 22, 2021

(65) Prior Publication Data
US 2024/0124132 A1  Apr. 18, 2024

(30) Foreign Application Priority Data
Oct. 17, 2019  (FR) ..................... 1911645

(51) Int. Cl.
*B64C 25/28*  (2006.01)
*B64D 45/00*  (2006.01)
*E05B 81/72*  (2014.01)

(52) U.S. Cl.
CPC .......... *B64C 25/28* (2013.01); *B64D 45/0005* (2013.01); *E05B 81/72* (2013.01)

(58) Field of Classification Search
CPC ...... B64C 25/26; B64C 25/28; B64D 45/0005
See application file for complete search history.

(56) References Cited

U.S. PATENT DOCUMENTS

| 7,883,125 B2 * | 2/2011 | Smith, III | E05B 81/14 |
|---|---|---|---|
| | | | 292/201 |
| 10,124,884 B2 * | 11/2018 | Walke | B64C 25/26 |

(Continued)

FOREIGN PATENT DOCUMENTS

| DE | 102019119240 A1 * | 1/2021 | ........... B64C 1/1407 |
|---|---|---|---|
| EP | 1 342 664 A1 | 9/2003 | |

(Continued)

OTHER PUBLICATIONS

International Search Report of PCT/EP2020/079134 dated Mar. 1, 2021 [PCT/ISA/210].

*Primary Examiner* — Joshua J Michener
*Assistant Examiner* — Michael B. Kreiner
(74) *Attorney, Agent, or Firm* — Sughrue Mion, PLLC

(57) ABSTRACT

An uplock for the selective retention of a capture pin of a movable element includes a hook, a locking member, and a detector. The hook is movable between a release position and a retaining position for retaining the capture pin. The locking member moves between a locked position, and an unlocked position. The detector detects whether the hook is in the retaining position and the capture pin is in the hook. The detector includes a sensor movable relative to a target. The target or the sensor is carried by the locking member and the other by an indicator lever which is movable between a first position indicating absence of the capture pin in the hook and a second position indicating presence. The target and the sensor are only in the proximate position if the locking member is in the locked position and the indicator lever is in the second position.

9 Claims, 2 Drawing Sheets

(56) References Cited

U.S. PATENT DOCUMENTS

| | | | | |
|---|---|---|---|---|
| 11,492,136 | B2* | 11/2022 | Brighton | B64C 3/56 |
| 11,498,662 | B2* | 11/2022 | Kulkarni | B64C 25/20 |
| 11,560,219 | B2* | 1/2023 | McCambridge | B64D 45/0005 |
| 11,661,176 | B2* | 5/2023 | Gleave | B64C 25/28 |
| | | | | 244/102 A |
| 11,738,858 | B2* | 8/2023 | Wells | B64D 45/0005 |
| | | | | 244/102 SL |
| 2003/0164421 | A1* | 9/2003 | Collet | B64C 25/26 |
| | | | | 244/102 R |
| 2023/0031765 | A1* | 2/2023 | Dufay | F16C 23/045 |

FOREIGN PATENT DOCUMENTS

| | | |
|---|---|---|
| GB | 2 561 383 A | 10/2018 |
| WO | 2018/189299 A1 | 10/2018 |

* cited by examiner

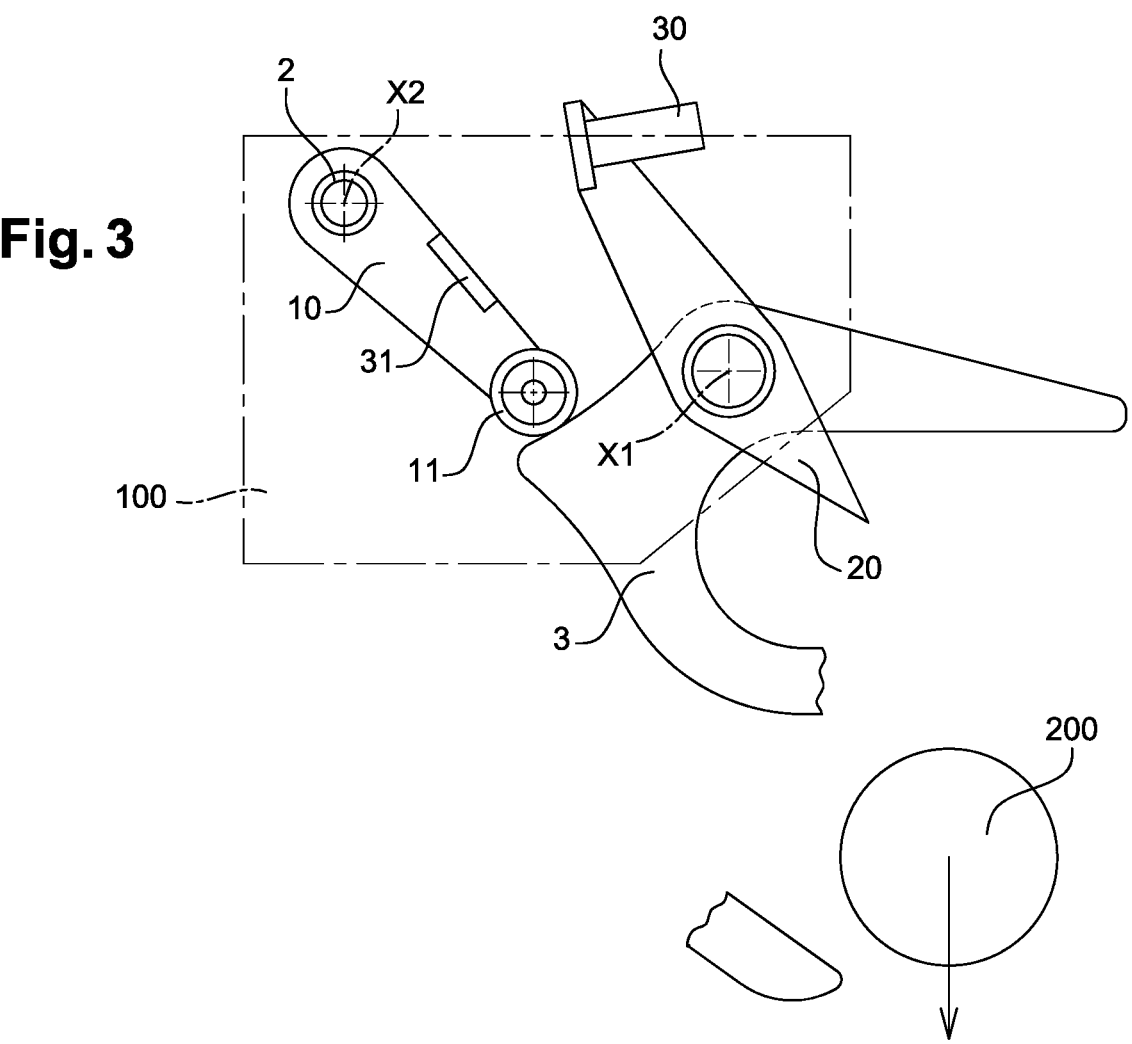

UPLOCK PROVIDED WITH RETENTION DETECTION MEANS

CROSS REFERENCE TO RELATED APPLICATIONS

This application is a National Stage of International Application No. PCT/EP2020/079134 filed on Oct. 15, 2020, claiming priority based on French Patent Application No. 1911645 filed on Oct. 17, 2019, the entire contents of each of which being herein incorporated by reference in their entireties.

The invention relates to an uplock such as those used in aircraft for retaining landing gear or cargo hold doors of the aircraft in the retracted position, and more generally for retaining any moving element of the aircraft in one of its positions.

BACKGROUND OF THE INVENTION

In a manner which is known per se, an uplock of this type comprises a hook which is pivotally mounted on the uplock between a retaining position and a release position, and a member for locking the hook which is urged into a position for locking the hook when the hook is brought into the retaining position, and which is pushed back towards an unlocked position by an unlocking actuator in order to enable the hook to swing towards the release position and thus release the movable element.

The hook co-operates with a capture pin of the movable element which, when the element arrives at the position in which it is to be retained, pushes the hook into the retaining position in which the hook is automatically locked by the locking member. The capture pin of the movable element is then trapped in the hook and cannot be released therefrom. To enable the movable element to be released, the locking member has to be pushed back into the unlocked position, for example by means of an unlocking actuator. The movable element is then free to leave the position in which it was retained; the capture pin drives the hook from the retaining position towards the release position.

The uplock is usually provided with a proximity sensor in order to detect the position of the locking member. To this end, the locking member is equipped with a target which is movable between a position that is remote from the proximity sensor and a position that is proximate to the proximity sensor, each position of the target being associated with one of the positions of the locking member, so that the electrical signal generated by the proximity sensor changes when the locking member passes from the unlocked position to the locked position and vice versa. Detecting the locking member in the locked position means that the capture pin has pushed the hook into the retaining position in which it is automatically locked, so that this detection also corresponds to the indirect detection of retention of the movable element.

However, on occasion, the hook has been correctly detected in its retaining position, but in fact the capture pin has not been retained by the hook because part of the hook has broken, preventing it from retaining the capture pin. Under these exceptional circumstances, detection of the hook in the retaining position does not guarantee that the movable element has in fact been retained.

The document WO 2018/189299 proposes providing the casing with a second proximity sensor to detect whether the capture pin is in fact present in the hook when the latter is in its retaining position. To this end, a second target is carried by an indicator lever which is pushed back by the capture pin itself and which places the second target in a position remote from the sensor if the capture pin is not in the hook and in a position proximate to the second sensor if the capture pin is in the hook in the retaining position. Thus, the movable element will be considered to be effectively retained if the first sensor indicates that the locking member is in the locked position and if the second sensor indicates that the capture pin is in fact present in the hook. This arrangement necessarily involves the less robust use of two sensors, and necessitates making a logic combination of two signals.

This same document proposes the use of only one proximity sensor, by placing it on the uplock so that it is capable of detecting the simultaneous proximate presence of two targets respectively linked to the locking member and to the indicator lever, the two targets only approaching the proximity sensor if the locking member and the hook are in the locked position and if the capture pin is present in the hook. However, the simultaneous detection of several proximate targets by the same sensor is difficult to control and can generate false detections.

OBJECTIVE OF THE INVENTION

The objective of the invention is to propose an uplock that makes it possible to detect the hook in the retaining position and the capture pin present in the hook in a reliable manner, without the need for digital processing or delicate multi-target control.

SUMMARY OF THE INVENTION

In order to achieve this objective, an uplock for selectively retaining a capture pin of a movable element is proposed, the uplock comprising:
 a hook which is movable between a release position and a position for retaining a capture pin of the movable element;
 a locking member interacting with the hook and movable between a locked position in which it immobilizes the hook in the retaining position, and an unlocked position in which the hook is free to be displaced under the force of the capture pin of the movable element;
 detection means adapted to detect a situation in which the hook is in the retaining position AND the capture pin is present in the hook.

According to the invention, the detection means comprise a sensor and a target which are movable relative to each other between a proximate position and one or more positions which are remote from each other, one of the target or the sensor being carried by the locking member and the other one of the target or the sensor being carried by an indicator lever which interacts with the capture pin and which is movable between a first position which is indicative of the absence of the capture pin in the hook and a second position which is indicative of the presence of the capture pin in the hook, so that the target and the sensor are only in the proximate position if the locking member is in the locked position and if the indicator lever is in the second position which is indicative of the presence of the capture pin in the hook.

When it is indicated that two elements are interacting, it should be understood here to mean that the movement of one element causes the movement of the other element, either directly or via one or more intermediate elements. Thus, in accordance with the provisions of the invention, the signal from the sensor is only modified if the target and the sensor are in the proximate position, which can only occur if the two desired conditions, namely the hook in the retaining position and the capture pin present in the hook, are met simultaneously. According to the invention, therefore, a logical and mechanical function is produced, which has the advantage of using only one target and only one sensor, and does not require any digital processing.

In a particular aspect of the invention, the indicator lever is pivotally mounted on the uplock. According to a particular arrangement, the indicator lever and the hook are pivotally mounted on the same pivot.

BRIEF DESCRIPTION OF THE DRAWINGS

The invention will be better understood in the light of the following detailed description of a particular embodiment of the invention, made with reference to the accompanying drawings, in which:

FIG. 3 is an analogous view to that of FIG. 1, illustrating the hook in the locked position while the capture pin has been released from the hook following breakage of a portion thereof.

DETAILED DESCRIPTION OF THE INVENTION

Figure 1:
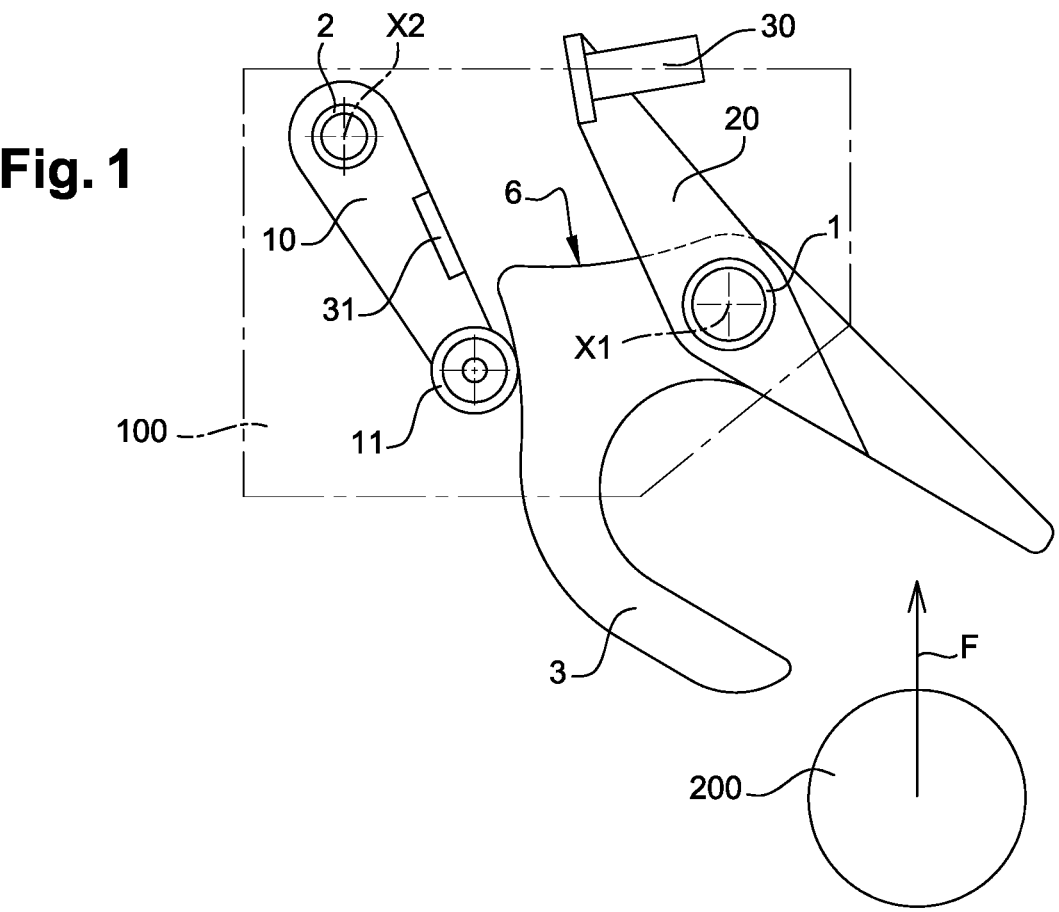
FIG. 1 is a diagrammatic front view of an uplock in accordance with a first particular embodiment of the invention, illustrated while the hook is in the release position, the capture pin of the movable element approaching the hook.

With reference to the figures, the uplock of the invention comprises a plate 100 carrying a first pivot 1 and a second pivot 2, defining parallel pivot axes X1 and X2. A hook 3 is pivotally mounted on the first pivot 1 about the axis X1 so as to pivot between a release position illustrated in FIG. 1, towards which it is urged by a spring (not shown), and a retaining position illustrated in FIGS. 2 and 3. The hook 3 comprises a hook portion 5 in which a capture pin 200 of a movable element (for example aircraft landing gear or a cargo hold door) is intended to be retained by the uplock in order to immobilize the movable element (for example in the retracted position for the landing gear, or in the closed position for the cargo hold door). To this end, the movable element is displaced by a maneuvering actuator and the capture pin 200 follows the trajectory F, forcing the hook 3 towards the locked position in which it retains the capture pin 200. For this purpose, a locking member 10 is pivotally mounted on the second pivot 2 about the axis X2 and comprises a roller 11 which permanently bears on a cam profile 6 of the hook 3. The locking member 10 pivots between an unlocked position illustrated in FIG. 1 and a locked position illustrated in FIGS. 2 and 3, into which it is returned automatically by a spring (not shown) and which it reaches automatically when the hook 3 arrives in the retaining position. In the locked position, the locking member 10 locks the hook 3 in the retaining position. To release the capture pin 200, an unlocking actuator (not shown) urges the locking member 10 towards the unlocked position, which enables the hook 3 to pivot towards the release position, and therefore enables the capture pin 200 to leave the hook 3.

Figure 2:
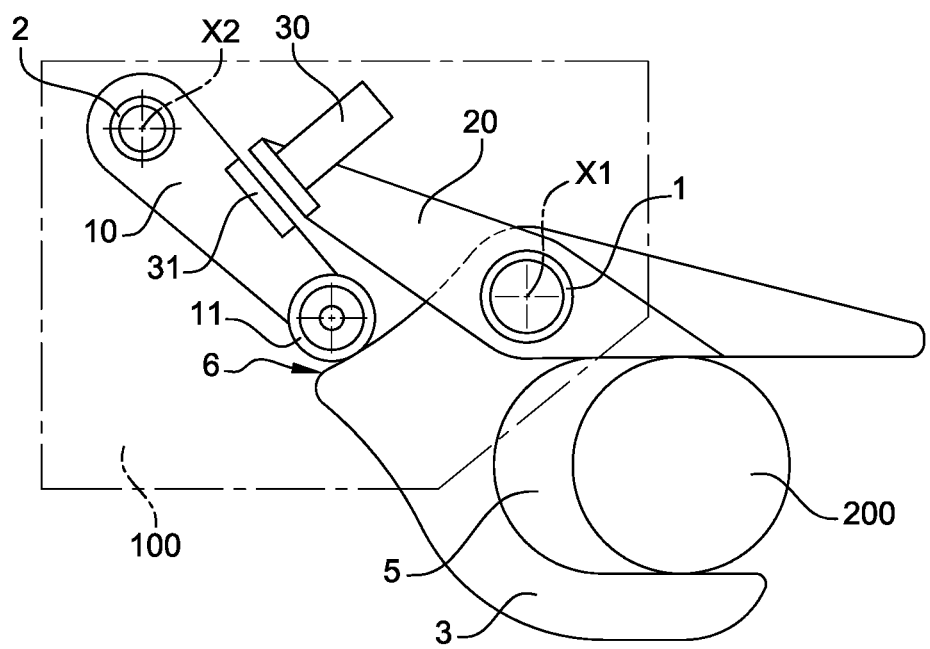
FIG. 2 is an analogous view to that of FIG. 1, illustrating the hook in the locked position while the capture pin is in fact retained by the hook.

The uplock further comprises an indicator lever 20, in this case pivotally mounted on the first pivot 1 about the axis X1, and movable between a position which is indicative of the presence of the capture pin 200 in the hook 3 illustrated in FIG. 2, in which it is pushed back by the capture pin 200 when the latter approaches the hook 3, and a position indicating the absence of the capture pin 200 in the hook 3, illustrated in FIGS. 1 and 3, towards which the indicator lever 20 is urged by a spring (not shown).

The uplock also includes a proximity sensor 30 carried here by the indicator lever 20, and a target 31 carried here by the locking member 10. The proximity sensor 30 and the target 31 are movable relative to each other between a proximate position as shown in FIG. 2, and one or more remote positions shown in FIGS. 1 and 3. The proximity sensor 30 produces an electrical signal the characteristics of which change when the target 31 and the proximity sensor 30 pass from one relative position to the other, which makes it possible to distinguish between the two positions of the target 31 relative to the proximity sensor 30.

The uplock of the invention functions as follows. The initial situation is illustrated in FIG. 1 where the hook 3 is in the release position, the locking member is in its unlocked position and the indicator lever 20 is in the position indicating that there is no capture pin in the hook 3. In this position, the proximity sensor 30 and the target 31 are remote from each other. The movable element is then operated in order to approach its immobilization position. The capture pin 200 then moves in the direction F and pushes the hook 3 towards the retaining position and the indicator lever 20 towards the position indicating the presence of the capture pin 200 in the hook 3. When the hook 3 reaches the retaining position, the locking member 10 is automatically placed in the locked position to lock the hook 3 in the retaining position, while the indicator lever 20 is pushed back into the position indicating the presence of the capture pin in the hook. In this position illustrated in FIG. 2, the proximity sensor 30 and the target 31 are proximate to each other, so that the signal from the proximity sensor 30 changes, which makes it possible to determine that the capture pin 200 has been correctly retained by the hook.

It may be the case that the hook 3 breaks and no longer retains the capture pin 200. In this situation, illustrated in FIG. 3, the capture pin 200 has left the hook 3 (for example under the effect of gravity), while the latter is still immobilized in the retaining position. In so doing, the indicator lever 20 is returned under the effect of its return spring to the position indicating the absence of a capture pin in the hook, so that the target 31 is moved away from the proximity sensor 30. The signal from the sensor changes, indicating that the capture pin 200 is no longer retained by the hook 3 even though the latter remains immobilized in the retaining position.

Thus, and according to an essential feature of the invention, the target 31 can only reach the position proximate to the proximity sensor 30 if, simultaneously, the hook 3 is locked in the retaining position and if the capture pin 200 is in fact present in the hook. The provisions of the invention make it possible to implement a logic function and a mechanical function, requiring the use of only one target and one sensor.

The invention is not limited to what has just been described, but in contrast encompasses any variation which falls within the scope defined by the claims.

In particular, although the use of a proximity sensor which cooperates with a dedicated target has been described here, it would be possible to use other technologies such as a microswitch or an optical sensor. Under such circumstances, the target will be directly that of the locking member or the indicator lever which does not carry the sensor.

Although the sensor here is carried by the indicator lever and the target is carried by the locking member, this arrangement could of course be reversed by causing the sensor to be carried by the locking member and the target by the indicator lever.

Although the indicator lever here is pivotally mounted on the same pivot as the hook, the indicator lever could be pivotally mounted on another pivot, for example the pivot of the locking member or any other pivot. More generally, although it has been indicated that the indicator lever is pivotally mounted, it could be movable by interaction with the capture pin, so that it has at least one position relatively proximate to the locking member, and one or more positions which are relatively remote from the locking member.

Clearly, to ensure redundancy, it is possible to use a second sensor/target assembly, if necessary by using a second indicator lever.

The invention claimed is:

1. An uplock for the selective retention of a capture pin of a movable element, the uplock comprising:
   a hook which is movable between a release position and a position for retaining a capture pin of the movable element;
   a locking member interacting with the hook and movable between a locked position in which it immobilizes the hook in the retaining position, and an unlocked position in which the hook is free to be displaced under the force of the capture pin of the movable element;
   detection means adapted to detect a situation in which the hook is in the retaining position and if the capture pin is present in the hook;
   characterized in that the detection means comprise a sensor and a target which are movable relative to each other between a proximate position and one or more positions which are remote from each other, one of the target or the sensor being carried by the locking member and the other of the target or the sensor being carried by an indicator lever which interacts with the capture pin and which is movable between a first position which is indicative of the absence of the capture pin in the hook and a second position which is indicative of the presence of the capture pin in the hook, so that the target and the sensor are only in the proximate position if the locking member is in the locked position and if the indicator lever is in the second position which is indicative of the presence of the capture pin in the hook.

2. The uplock as claimed in claim 1, in which the indicator lever is pivotally mounted on the uplock.

3. The uplock as claimed in claim 2, in which the indicator lever and the hook are pivotally mounted on the same pivot.

4. The uplock as claimed in claim 1 comprising, for redundancy purposes, two assemblies each comprising a sensor and a target disposed in a manner such that the target and the sensor are in the proximate position only if the locking member is in the locked position and if the indicator lever is in the second position which is indicative of the presence of the capture pin in the hook.

5. The uplock as claimed in claim 4, in which each assembly comprises an indicator lever.

6. The uplock as claimed in claim 1, in which the sensor is a proximity sensor.

7. A landing gear assembly comprising an element which is movable between a first position and a second position in which a capture pin that is integral with the movable element is received in the hook of an uplock as claimed in claim 1.

8. The landing gear assembly as claimed in claim 7, in which the movable element is landing gear.

9. The landing gear assembly as claimed in claim 7, in which the movable element is a cargo hold door.

* * * * *